United States Patent [19]

Ricciardi et al.

[11] Patent Number: 4,963,593

[45] Date of Patent: Oct. 16, 1990

[54] FLAME RETARDANT INTERNALLY CURED POLYURETHANE FOAM HAVING IMPROVED PROPERTIES

[75] Inventors: Michael A. Ricciardi, Statesville, N.C.; Fred N. Teumac, Spartanburg, S.C.

[73] Assignee: Knoll International Holdings, Inc., New York, N.Y.

[21] Appl. No.: 216,592

[22] Filed: Jul. 7, 1988

[51] Int. Cl.$^5$ .................................... C08J 9/00
[52] U.S. Cl. ................... 521/128; 521/107; 521/163; 521/164; 521/168; 521/169
[58] Field of Search ............... 521/107, 128, 163, 164, 521/168, 169; 252/609

[56] References Cited

U.S. PATENT DOCUMENTS

| | | | |
|---|---|---|---|
| 3,726,835 | 4/1973 | Bertozzi | 528/61 |
| 3,824,239 | 7/1974 | Narayan et al. | 544/154 |
| 4,139,501 | 2/1979 | Rudner et al. | 521/136 |
| 4,143,029 | 3/1979 | Matthews et al. | 524/94 |
| 4,197,373 | 4/1980 | Miano et al. | 521/128 |
| 4,374,207 | 2/1983 | Stone et al. | 521/107 |
| 4,537,912 | 8/1985 | Griswold | 521/53 |
| 4,699,933 | 10/1987 | Hefner, Jr. et al. | 521/166 |
| 4,708,984 | 11/1987 | Forgione et al. | 525/127 |
| 4,710,542 | 12/1987 | Forgione et al. | 525/127 |
| 4,722,942 | 2/1988 | Nichols et al. | 521/110 |
| 4,742,118 | 5/1988 | Parekh | 525/127 |
| 4,757,093 | 7/1988 | Ricciardi et al. | 521/107 |
| 4,757,094 | 7/1988 | Teumac et al. | 521/118 |

FOREIGN PATENT DOCUMENTS 245700 11/1987 European Pat. Off. .
245701 11/1987 European Pat. Off. .

*Primary Examiner*—John Kight, III
*Assistant Examiner*—S. A. Acquah
*Attorney, Agent, or Firm*—Pennie & Edmonds

[57] ABSTRACT

Flexible polyurethane foam prepared from foam forming compositions of a polyether polyol, an organic isocyanate compound, a blowing agent, and a curing agent of a melamine derivative in an amount effective to rapidly cure the resultant foam and improve the compression set properties of the foam, the amount of curing agent generally ranging from about 0.01 up to about 2 parts by weight based on 100 parts polyether polyol. Also, flame retardant polyether polyurethane foam prepared from foam forming components of a polyether polyol, an organic isocyanate compound, water, a liquid phosphorus ester in an amount of about 4 to 10 parts by weight and the curing agent in an amount of 0.4 to 2 parts by weight, each based on 100 parts by weight of the polyether polyol in the composition. The most preferred curing agent has the formula $$C_3N_6(R_2)_x(R_1)_{6-x}$$

wherein $R_1$ is hydrogen or an alkyl, alkenyl, cycloaliphatic or aryl moeity having between one and twelve carbon atoms; $R_2$ is an alkyl, alkenyl, cycloaliphatic or aryl moeity having between one and twelve carbon atoms and at least one hydroxyl moeity; and x is between about 0.5 and 6.

31 Claims, No Drawings

FLAME RETARDANT INTERNALLY CURED POLYURETHANE FOAM HAVING IMPROVED PROPERTIES

TECHNICAL FIELD

The invention relates to polyurethane foam-forming compositions and methods of forming flexible polyurethane foam therefrom in which a curing agent of a melamine derivative is added to a polyurethane foam-forming composition to internally cure the foam after formation as well as to concurrently improve the compression set properties of the foam. When flame retardant foams are desired, the curing agent can replace a portion of conventional liquid phosphorus ester flame retardant additives of the composition without loss of the necessary flame retardant properties of the foam.

BACKGROUND ART

Polyurethane foam is prepared commercially in the form of large blocks that are subsequently cut into the desired shape for use in the manufacture of various articles that require a foam padding. It is well known that polyurethane foam requires time to cure and develop its full physical properties. In typical polyurethane foam-forming formulations, a polyhydroxy material ("polyol"), water and an organic isocyanate compound are reacted in the presence of catalysts or other additives. Much of the time, a small percentage of terminal isocyanate groups are left unreacted in the foam structure. If the foam is distorted or compressed in this condition, it fails to recover its original dimensions when the distortive or compressive force is released. Normally, the terminal isocyanate groups that are left unreacted in the foam structure will react with the residual water in the foam structure or with the water vapor in the atmosphere over a period of several hours or days, and the foam will ultimately achieve its full physical properties.

Post-curing of polyether derived foam by exposure to a mixture of water vapor and gaseous ammonia, primary or secondary amines at temperatures of about 50° to 150° F. for a period of at least one minute is disclosed in U.S. Pat. No. 4,537,912. While this process effectively and rapidly cures the foam, it constitutes an additional step beyond those normally used in the foam manufacturing process. This process also requires storage of the foam prior to the post-curing treatment. It is more desirable to cure the foam as it is manufactured to reduce or even eliminate such storage time and to prepare a fully cured foam material which can be immediately shipped to the end users after cutting to the desired shapes.

U.S. Pat. No. 4,757,094 discloses that melamine powder can be added to the foam-forming components of a flexible polyether derived polyurethane foam formulation to cure the foam during or immediately after the foam forming step. Also, U.S. Pat. No. 4,757,093 discloses that melamine powder can be substituted for a portion of the liquid phosphorus flame retardant ester in such foam-forming formulations without loss of flame retardance in the resultant foam.

U.S. Pat. No. 3,726,835 discloses that melamine or dicyandiamide can be utilized as a stabilizer for polyurethane prepolymers which are thereafter cured to form elastomeric polymers. In these compositions, 10 parts melamine or dicyandiamide is added to 100 parts prepolymer.

U.S. Pat. No. 3,824,239 discloses triazine compositions which can be used as catalysts for the preparation of rigid cellular foams.

U.S. Pat. No. 4,143,029 discloses dripless, fireretarded, polyurethane elastomers which include certain melamine derivatives therein.

U.S. Pat. No. 4,374,207 discloses flexible, resilient, polyurethane foam having improved flame retardancy and intumescent properties prepared from a reaction mixture comprising a polyether polyol, an organic polyisocyanate, a blowing agent, a surfactant, a catalyst, a flame retardant and hydrated alumina, optionally with a char former of a melamine derivative.

U.S. Pat. Nos. 4,139,501 and 4,197,373 disclose polyether polyurethane foams containing, as a flame retardant additive, a melamine derivative, usually in an amount ranging from one to 20 weight percent of the polyol (in the '501 patent) and from 0.25 to 30 parts by weight based on 100 parts polyol in the '373 patent. The '501 patent also utilizes conventional halogenated esters in amounts ranging from 4 to 30 percent by weight of the polyol to further increase the flame retardance.

U.S. Pat. Nos. 4,708,984, 4,710,542 and 4,742,118 relate to cross-linking agents of aminotriazoles, aminotriazines, and S-triazines, respectively, for use in coatings.

U.S. Pat. No. 4,699,933 relates to a polyurethane composition which contains triazine groups prepared by reacting certain oligomers.

U.S. Pat. No. 4,722,942 relates to active hydrogen-containing compositions suitable for the production of flexible polyurethane foam when reacted with a polyisocyanate. These compositions contain, in relevant part, polycarbamates as one of a group of suitable polyfunctional flame retardant additives.

None of these references disclose the possibility of using a curing agent of a melamine derivative for rapidly curing flexible polyether polyurethane foam while concommittantly improving the compression set properties during foam formation, nor do they disclose the benefits of substituting small amounts of such curing agents for a portion of the conventional liquid phosphorous esters to maintain the desired flame retardance of the foam.

The present invention provides a one-step foaming and curing process which achieves a rapid and full post cure of the foam so that low compression set values as measured by ASTM standard test D-3574 (Constant Deflection Compression Set Test) are obtained, with the elimination of post curing steps, and with a reduction of conventional liquid phosphorus flame retardant esters while retaining the same degree of flame retardance of the foam.

SUMMARY OF THE INVENTION

The present invention relates to a flexible polyurethane foam forming composition comprising a polyether polyol; an organic isocyanate compound; water; a curing agent of a melamine derivative in an amount effective to rapidly cure the resultant foam and improve the compression set properties thereof, generally from about 0.01 to 2 parts by weight; and, optionally, between about 4 to 10 parts by weight of a liquid phosphorus ester flame retardant agent, said amounts based on 100 parts by weight of the polyether polyol.

Preferred curing agents are those melamine derivatives having the formula

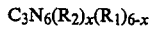

wherein $R_1$ is hydrogen or an alkyl, alkenyl, cycloaliphatic, or aryl moiety having between one and twelve carbon atoms; $R_2$ is an alkyl, alkenyl, cycloaliphatic or aryl moiety having between one and twelve carbon atoms and at least one hydroxyl moiety; and x is between about 0.5 to 6, inclusive. This formula is an abbreviation for the following structure.

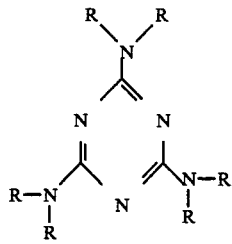

or $C_3N_6R_6$ where $R_6=(R_2)_x(R_1)_{6-x}$. Preferably, $R_1$ is hydrogen; $R_2$ is a hydroxy alkyl moiety having between 2 and 4 carbon atoms; and x is between 2 and 3. This curing agent is preferably used in an amount of between about 0.4 and 1.4 parts by weight based on 100 parts by weight of a conventional, unmodified polyether polyol.

Since these curing agents are somewhat soluble in the polyol, it has been found convenient to add the curing agent to the polyol prior to preparing the overall foam-forming composition. To increase the solubility of the agent in the polyol, the polyol can be heated to about 80°–100° F. Also, lower molecular weight polyols have greater solubility for these agents than higher molecular weight counterparts, and for that reason are advantageous for adding the curing agent to the mixture of foam forming components.

Another embodiment of the invention relates to a method for rapidly curing and improving the compression set properties of a flexible polyether derived polyurethane foam which comprises adding the curing agent to the polyether polyol component of a polyurethane foam-forming composition which also includes an organic isocyanate compound and water as a blowing agent. The curing agent is added in an amount sufficient to rapidly cure the resultant foam and improve the compression set properties and up to about 2 parts by weight based on 100 parts by weight of the polyether polyol, and thereafter the polyurethane foam is formed from the foam-forming composition.

An alternate embodiment of this method relates to maintaining the flame retardant properties of a polyether polyurethane foam prepared from a polyurethane foam-forming composition comprising a polyether polyol, an organic isocyanate compound, water, and a liquid phosphorous ester flame retardant additive. This method includes the steps of replacing a minor portion of the liquid phosphorous ester with a small amount of the curing agent prior to forming the foam from the composition.

In this embodiment of the invention, it has been found that, generally, between 1 and 6 parts of the ester, which would ordinarily be used in an amount of between about 8 to 10 parts, can be replaced with less than 4 and preferably between about 0.2 and 2 parts of the curing agent with no loss of flame retardant properties of the foam. Thus, the amount of curing agent which is to replace part of the ester ranges from about 20 to 400 percent of the minor portion of the ester which is to be replaced. Preferably, this amount ranges from about 50 to 100 percent of the minor portion of the ester. "Minor portion" is used to mean less than half of the amount of flame retardant ester additive which would normally be used. Preferably, less than 33% or even less than 25% by weight of the total amount of ester additive is replaced by the curing agent. Thereafter, the foam is formed from the foam-forming composition.

DETAILED DESCRIPTION OF THE INVENTION

The objectives of this invention are accomplished by incorporating into the foam forming components of a flexible polyether polyurethane foam composition a small amount of the curing agent, preferably of a melamine derivative of the formula given above. Then, during the foam-forming reaction, the curing agent rapidly cures the foam, i.e., it improves the resulting compression set properties of the foam. This amount of curing agent also replaces a portion of the conventional liquid phosphorus ester flame retardant agent without reducing the flame retardant properties of the foam.

As pointed out in the Encyclopedia of Polymer Science and Technology (John Wiley and Sons, New York 1969) in the section on Polyurethanes, polyethers are commercially the most important of the polyols used to prepare polyurethanes. At the present time most of the polyethers used in the production of flexible polyurethane foams are derived from propylene oxide and ethylene oxide. In this preparation, propylene oxide is reacted with glycerol in the presence of a basic catalyst to form a poly(oxypropylene) homopolymer which is further reacted with ethylene oxide to form a block copolymer.

The term "polyether polyurethane" as used throughout this application refers to conventional unmodified polyurethanes derived from such polyether polyols. This class would include the poly(oxytetramethylene) glycols which are prepared by the polymerization of tetrahydrofuran. Poly(oxypropylene) triols are another important group of polyethers used in the manufacture of polyurethanes which are included in this class. These triols are prepared by the same general reactions as poly(oxypropylene) glycols. The polyurethanes derived from polyesters do not normally present post-curing problems and thus do not form part of this invention.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate;

the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. Certain preferred crude isocyanates are disclosed in U.S. Pat. No. 3,215,652.

The polyurethane foams employed in the present invention are generally prepared by the reaction of the polyether polyol with the organic isocyanate compound in the presence of a blowing agent, i.e., water and, optionally, in the presence of additional polyhydroxyl-containing components, chain-extending agents, catalysts, surface-active agents, stabilizers, dyes, fillers and pigments. The preparation of cellular polyurethane plastic foam is well known in the art. Corresponding quantities of excess isocyanate compound are used to react with the water, which is generally used in an amount of less than about 6 parts based on 100 parts polyether polyol, to produce carbon dioxide.

Flexible, one shot polyurethane foam is formed by two principal reactions:

1. The reaction of hydroxyl groups in a polymeric polyol with an isocyanate group to form a urethane linkage. Because of difunctional isocyanates, oligomers are formed. As the reaction proceeds, the viscosity increases to a point that the mixture is said to have "creamed".

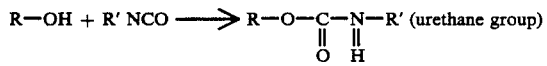

2. Water reacts with an isocyanate group to form an unstable carbamic acid. The acid decomposes to generate $CO_2$ and an amine. The amine in turn reacts with an isocyanate to form a urea group.

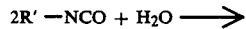

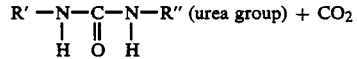

The presence of excess isocyanate groups in the formulation promotes cross-linking by reacting with the previously formed urethane and urea linkages to form allophonates and biurets. This begins to occur at about 80° C. While the use of excess isocyanate is important for stabilizing the foam as it forms and for improving physical properties, this excess can also lead to isocyanate groups being physically trapped within the matrix after foam formation. As the —OH's and —NH's are consumed by the reaction, those remaining biurets and allophonates also become fixed in some locations. The result is that unreacted isocyanate groups remain in the foam.

Poor compression sets are said to result when unreacted isocyanate groups on a cell wall are forced by compression against another wall. If these isocyanate groups react when compressed, the deformation is permanent; hence, poor compression set properties of the foam are obtained.

The problem then becomes how to provide enough isocyanate to form the foam without also obtaining poor compression set properties. Three solutions are known:

1. Atmospheric moisture, which is always present in the foam slab, can eventually react with the excess isocyanate groups. This moisture is present primarily due to diffusion of the humidity from the atmosphere, while some moisture may be present due to the use of excess water in the foam forming ingredients. Whatever the source, this moisture is available in the foam for reaction with the excess isocyanate. Because of the size of the foam slab and the uncooperativeness of nature in providing reliable relative humidity, this reaction can take three days to six weeks and is not a practical solution. In addition, it is not possible to predict when the reaction is substantially complete, so the foam must be tested periodically with a test that takes 24 hours.

2. The forced cure process described in U.S. Pat. No. 4,537,912 can be used: ammonia and moisture vapor are brought to the isocyanate to effect an essentially instant cure. While this extra processing adds to the cost of the foam and presents logistical problems, it at least makes it possible to plan on reliable compression set properties while eliminating the need for excessive storage areas for holding the foam as it cures.

3. Melamine powder can be added to the foam-forming components as disclosed in U.S. Pat. No. 4,757,094. While this procedure is highly successful, additional processing equipment is needed to monitor the correct amount of solid melamine power which is to be introduced into the liquid foam-forming components.

We have now discovered that it is indeed possible to use high enough isocyanate indices for foam formation and still not interfere with rapidly obtaining good compression sets. A curing agent of a melamine derivative, when added in small amounts into the foam-forming components and preferably into an admixture with the polyol, provides a simple, inexpensive solution. This agent is easy to disperse, can be premixed with the liquid polyol and easily introduced and monitored into the foam forming components, does not react with the foam-forming components, does not interfere with the foaming process, and does not detract from the physical properties of the foam. In fact, it even marginally improves the physical properties of the foam and provides some flame retardant properties as well. Furthermore, because it can be solubilized in water or the polyol, it can be conveniently added with less sophisticated equipment than is necessary for introducing solids into the reaction components.

The curing agent appears to work very much like melamine powder or ammonia, i.e., as a catalyst for the reaction of the remaining isocyanate groups with the moisture that is present in the foam.

Because of the high reactivity of ammonia, it cannot be introduced to the foam until the chemistry is essentially complete. Ammonia cannot be added to the foam-forming components and, in fact, cannot be introduced until the foam is several hours old. When introduced with moisture, it catalyzes the almost instantaneous reaction of the remaining isocyanate groups with water. Thus, an ammonia/water vapor mixture is used to cure the foam after formation according to U.S. Pat. No.

4,537,912. As noted above, U.S. Pat. No. 4,757,094 discloses that melamine can be added to the foam-forming components because it is non-reactive with the foam-forming components, but it requires additional processing equipment since it is in the form of a solid powder.

The present curing agent is used in a manner analogous to melamine but provides further advantages over melamine in that it is somewhat soluble in the polyol of the starting ingredients. Thus, the agent can be easily mixed into the polyol injection line and carefully monitored based on the flow rate of the polyol and the relative proportion of agent mixed therewith. To facilitate the combination of the agent and the polyol, the polyol can be heated, e.g. to about 80°-100° F. Alternatively, a relatively low molecular polyether polyol can be used for increased solubility of the curing agent therein.

Since the reaction of these curing agents with the isocyanate component is slow if at all, its catalytic effect would be weaker than ammonia, and it can be added to the foam forming ingredients. There appears to be no effect on cream time. As the temperature rises, there appears to be some effect on the rate of rise. This shortening of rise time is an indication that the water/isocyanate reaction is being catalyzed. When the rise is complete, the unreacted isocyanate appears to be at least partially complexed by the curing agent. As the gases in the open cell foam are exchanged with the atmosphere, the moisture in the humidity of the surrounding air enters the bun. The moisture finds this reactive complex and reacts to eliminate the isocyanate As noted above, the most preferred curing agents are those having the formula $$C_3N_6(R_2)_x(R_1)_{6-x}$$

wherein $R_1$ is hydrogen or an alkyl, alkenyl, cycloaliphatic, or aryl moiety having between one and twelve carbon atoms; $R_2$ is an alkyl, alkenyl, cycloaliphatic, or aryl moiety having between one and twelve carbon atoms and at least one hydroxyl moiety; and x is between about 0.5 to 6, inclusive.

Preferably, $R_1$ is hydrogen; $R_2$ is a hydroxyl alkyl moiety having between 2 and 4 carbon atoms; and x is between 2 and 3, inclusive. This curing agent is preferably used in an amount of between about 0.01 and 2, preferably between 0.4 and 1.4 parts by weight based on 100 parts by weight of the polyether polyol.

The most preferred material is known in the trade as MELPOL ®, and is available from American Cyanamid. The formula for this material is $C_3N_6H_{3.5}(CH_2CHOHCH_3)_{2.5}$, since this material is a mixture of about 5% by weight $C_3N_6H_5(CH_2CHOHCH_3)$, 40% $C_3N_6H_4(CH_2CHOHCH_3)_2$ and 55% $C_3N_6H_3(CH_2CHOHCH_3)_3$.

It has also been found that the MELPOL ® compound, a waxy solid, can be solubilized in water or conventional polyether polyols to allow suitable quantities of the compound to be added to the foam forming formulations by incorporation into the polyol. Heating the polyol or using polyols of lower molecular weight increases the solubility of the MELPOL ® compound therein. Thus, further preferred compounds of formula are those which have a higher degree of solubility in the polyol or other foam forming components.

As noted above, the curing agent is added to the foam-forming composition to cure the foam immediately after foam formation so that greatly improved (i.e. lower) compression set values are obtained, as determined according to ASTM test method D-3574.

As noted above, when the MELPOL ® compound is used as the curing agent, an amount of between 0.01 and 2 parts by weight, preferably between 0.4 and 1.4 parts by weight, has been found to be suitable. Since the MELPOL ® compound can be solubilized in the normal polyether polyols which are utilized, a particularly convenient way to add the MELPOL ® compound to the foam forming components, is in solution with all or a portion of the polyol. Thus, a 25% to 50% by weight solution of MELPOL ® compound in the polyol can be prepared so that the use of an amount of about 2 parts of the mixture effectively introduces 0.5 to 1 part by weight of the MELPOL ® compound to the foam-forming components. The remaining amount of polyol can be decreased to 98.5 to 99 parts so that the resultant formulation contains a total of 100 parts by weight of the polyol. The solubility of the MELPOL ® compound in the polyol does not affect the polymerization process, and provides an additional advantage in that a lower amount of MELPOL ® compound (compared to a solid powder such as melamine which is insoluble) is used to achieve similar physical properties and flame retardance in the foam.

While a single curing agent is added for ease of formulation of the foam, it is understood that mixtures of two or more of these agents may be used in combination, and such combinations are contemplated by this invention.

It has also been found that the curing agent is capable of replacing a portion of the more expensive conventional flame retardant(s) in small amounts without reducing the flame retardant characteristics of the foam.

Suitable flame retardants for use in the composition of the invention include those which are conventionally used in the art of making flexible, flame retardant polyurethane foams, such as tri-esters of phosphoric acid, halogenated triesters of phosphoric acid, halogenated hydrocarbons, and the like.

Specific examples of such suitable flame retardants are: tris(1,3-dichloropropyl)phosphate, tris(2,3-dibromopropyl)phosphate, 2,2-bis(chloromethyl)-1,3-propylene bis[di(2-chloroethyl)phosphate],tris(2-chloroethyl)phosphate, tris(2-chloroprophyl)phosphate, bis(dichloropropyl) tribromoneopentyl phosphate, tetrakis(2-chloroethyl) ethylene diphosphate (sold by Olin Chemicals as THERMOLIN ®101), FYROL ® EFF(oligomeric chloroalkyl phosphate, sold by Stauffer Chemical Co.), tricresyl phosphate, cresyl diphenyl phosphate, chlorinated paraffin, and brominated paraffin. Halogenated phosphates are generally preferred as flame retardant additives in polyether polyurethane foams of the invention, especially tris(1,3-dichloropropyl)phosphate, tris(2-chloroethyl)phosphate, FYROL ® EFF, and tetrakis(2-chloroethyl)ethylene diphosphate, with the first and lastnamed being particularly preferred.

It is also possible to utilize in this invention liquid flame retardant agents similar to those described above but which also contain reactive hydroxyl groups in their structure, such as VIRCOL 82.

Although a single flame retardant is preferred from the standpoint of simplicity of formulation, mixtures of two or more of the same type or of different types may be found to give improved performance in some cases, and such mixtures may be included in the foams of this invention. The amount of flame retardant additive or mixture according to the prior art generally ranges from about 8 to about 10 parts by weight per 100 parts by weight of polyol in the foam forming composition, however, depending upon the specific compound used, the amounts could range from 5 to 20 parts by weight based on 100 parts by weight polyol, or even more. In this invention, it is found advantageous to use from about 4 to about 8 parts by weight of the ester along with less than 4, preferably between 0.2 and 2, and most preferably between 0.4 and 1.4, parts of the curing agent to achieve the desired flame retardance.

Other additives for forming the foam which may be incorporated into these form foaming compositions are well known to those skilled in the art, and would include, for example, catalysts, chain extending agents, and surfactants or surface active agents.

Chain-extending agents which may be employed in the preparation of the polyurethane foams of the invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamine, N'N-di(2-dydroxypropyl)ethylenediamine, piperazine, and 2-methylpiperazine.

Any suitable catalyst or combination of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts include, for example, stannous octoate, stannous chloride, dibutyltin di-2-ethyl hexanoate, stannous oxide, as well as other organometallic compounds such as are disclosed in U.S. Pat. No. 2,846,408.

A surfactant or surface-active agent is generally necessary for production of high grade polyurethane foam according to the present invention, since in the absence of same, the foams may collapse or contain very large uneven cells. Numerous surface-active agents have been found satisfactory, with nonionic surface active agents being preferred. Of these, the well-known silicones have been found to be particularly advantageous. Other surface-active agents which are operative, include polyethylene glycol ethers of long chain alcohols, tertiary amine or alkanolamine salts of long chain alkyl acid sulfate esters, alkyl sulfonic esters, and alkyl arylsulfonic acids.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified, while the density values are reported in pounds per cubic feet, the porosity values in cubic decimeters per second and the compression set values in percent loss as defined in ASTM D-3574.

Also, unless noted otherwise, all references to the curing agent refer to the American Cyanamid MELPOL ® compound described above.

The following foam-forming formulations were prepared:

| Component | parts by weight for Example | | | | |
|---|---|---|---|---|---|
| | 1 | 2 | 3 | 4 | 5 |
| polyether polyol* (3500 mw) | 100 | 98.5 | 98.5 | 98.5 | 98.5 |
| toluene diisocyanate (80/20) | 46.7 | 45.0 | 46.0 | 45.0 | 46.0 |
| water | 3.5 | 3.5 | 3.5 | 3.5 | 3.5 |
| stannous octoate catalyst | 0.4 | 0.35 | 0.35 | 0.46 | 0.45 |
| silicone surfactant | 1.1 | 1.1 | 1.1 | 1.1 | 1.1 |
| amine catalyst | 0.27 | 0.27 | 0.27 | 0.27 | 0.27 |
| MELPOL ® blend** | — | 2.0 | 2.0 | 2.0 | 2.0 |
| AB-80 | 3.0 | 8.0 | 8.0 | 8.0 | 8.0 |
| AB-150 | 5.0 | — | — | — | — |

*Polyol 3800 from Dow Chemical
**Solution of 25% MELPOL ® compound and 75% Polyol 3800

Example 1 is a control, while the foams of Examples 2-5 effectively contain 0.5 parts of the MELPOL ® compound and 100 parts polyether polyol. These foams were prepared at room temperature and then tested to find the following properties.

| Property | Example | | | | |
|---|---|---|---|---|---|
| | 1 | 2 | 3 | 4 | 5 |
| Density | 1.7 | 1.8 | 1.72 | 1.71 | 1.7 |
| Porosity | 3.8 | 4.1 | 4.3 | 4.0 | 3.5 |
| 90% Compression Set | 5.52 (72 hr.) | 4.45 (24 hr.) | 3.37 (24 hr.) | 6.06 (24 hr.) | 5.72 (24 hr.) |
| MVSS-302 Burn test: | | | | | |
| Top | — | 3.0 SEO | 2.2 SE | — | — |
| Middle | — | 2.1 SEO | 2.4 SE | — | — |
| Bottom | — | 2.5 SEO | 2.4 SE | — | — |

The burn test samples denote average results from those taken from the top, middle and bottom portions of three samples of the foam. The SEO rating is as defined in MVSS-302, i.e., a self-extinguishing zero burn material. The other rating of SE indicates that some of the samples were self-extinguishing with no burn rate. The numbers in the table represent the burn rate of the sample in inches. As is evident from the compression set results, the foams containing the MELPOL ® compound achieved similar values in one day to that achieved by the control in 3 days.

EXAMPLES 6-8:

The following foam-forming formulations were prepared.

| Component | parts by weight for Example | | |
|---|---|---|---|
| | 6 | 7 | 8 |
| polyether polyol* (3500 mw) | 100.0 | 98.5 | 98.5 |
| toluene diisocyanate (80/20) | 39.4 | 38.0 | 38.7 |
| isocyanate index | 112 | 108 | 110 |
| water | 2.9 | 3.0 | 3.0 |
| stannous octoate catalyst | 0.42 | 0.42 | 0.42 |
| silicone surfactant | 1.2 | 1.2 | 1.2 |
| amine catalyst | 0.44 | 0.44 | 0.44 |
| MELPOL ® blend** | — | 2.0 | 2.0 |
| freon 11 | 3.0 | 3.0 | — |

*Polyol 3800 from Dow Chemical
**Solution of 25% MELPOL ® Compound and 75% Polyol 3800

The following properties were determined:

| Property | Example | | |
|---|---|---|---|
| | 6 | 7 | 8 |
| Density | 1.7 | 1.68 | 1.68 |
| Porosity | 4.9 | 3.5 | 3.0 |
| 90% Compression Set | 3.53 | 5.6 | 5.24 |
| ILD (25%) | 30.23 | 34.75 | 34.75 |

ILD is an abbreviation for identification load deflection. The 25% value refers to a 25% deflection at a 4" thickness, a standard test according to ASTM D-3574. These examples demonstrate that the use of the MELPOL® compound unexpectedly increases the ILD values even when lower isocyanate indexes are used. Again, the data illustrates that the foams of the invention achieve better compression set properties than the control.

EXAMPLES 9-10:

The following foam formulations were prepared.

| Component | Parts by Weight for Example | |
|---|---|---|
| | 9 (control) | 10 |
| polyether polyol* (3500 mw) | 100.0 | 98.5 |
| toluene diisocyanate (80/20) | 61.56 | 61.56 |
| isocyanate index | 112 | 112 |
| water | 5.05 | 5.05 |
| stannous octoate catalyst | 0.49 | 0.49 |
| silicone surfactant | 1.4 | 1.4 |
| amine catalyst | 0.28 | 0.28 |
| methylene chloride | 5.0 | 5.0 |
| freon 11 | 3.0 | 3.0 |
| MELPOL® blend** | — | 2.0 |

*Polyol 3550 from Dow Chemical
**Solution of MELPOL® Compound and 75% Polyol 3550

The following properties were determined:

| Property | Example | | |
|---|---|---|---|
| | | 9 (control) | 10 |
| Density | | 0.93 | 0.93 |
| Porosity | | 2.6 | 3.2 |
| 90% Compression | Top | 16.2 | 16.8 |
| Set | Middle | 22.1 | 13.5 |
| | Bottom | 33.3 | 25.5 |
| ILD (25%) | | 29.7 | 31.3 |

These examples illustrate the improvement in compression set and ILD properties by using the MELPOL® additive.

EXAMPLES 11-12:

To compare the usefulness of a curing agent of the MELPOL® compound to that of melamine powder, the following foam-forming formulations were prepared:

| Component | Parts by Weight for Example | |
|---|---|---|
| | 11 (control) | 12 |
| polyether polyol (3000 mw)* | 95 | 98.5 |
| toluene diisocyanate (80/20) | 63.03 | 63.03 |
| isocyanate index | 112 | 112 |
| water | 4.91 | 4.91 |
| stannous octoate catalyst | 0.4 | 0.4 |
| silicone surfactant | 1.04 | 1.04 |
| amine catalyst | 0.54 | 0.54 |
| flame retardant additive | 8.0 | 8.0 |
| freon 11 | 4.0 | 4.0 |
| MELPOL® blend** | — | 2.0 |
| melamine blend*** | 10.0 | — |

*Polyol 3010 from Dow Chemical
**Solution of MELPOL® compound and 75% Polyol 3010
***Suspension of 50% melamine powder and 50% Polyol 3010

The following properties were determined:

| Property | | Example | |
|---|---|---|---|
| | | 11 | 12 |
| Density | | 1.22 | 1.20 |
| Porosity | | | |
| 90% Compression | Top | 11.5 | 16.7 |
| Set 24 (hr) | Middle | 11.8 | 13.9 |
| | Bottom | 50.3 | 15.2 |
| 25% ILD (4") | Top | 32.8 | 32.4 |
| | Middle | 36.3 | 32.3 |
| | Bottom | 27.9 | 31.4 |
| California 117 Burn Test | | pass | pass |

The MELPOL® cured foam of Example 12 provides greater uniformity of ILD and 90% Compression sets compared to the melamine cured foam of Examples 11, while a significantly lower amount of the MELPOL® material is used.

EXAMPLES 13 AND 14:

To determine the optimum range of amounts of MELPOL® compound to be added as a curing agent, a conventional flexible polyether derived foam formulation was prepared. To this formulation, the MELPOL® compound was added in an amount of 0, 0.1, 0.3, 0.5, 0.75, 1.0 and 1.5 parts, based on 100 parts by weight of the polyether polyol. Example 13 introduced the MELPOL® compound by way of a 40% solution of the compound in dipropylene glycol: Example 14 utilized a 40% solution of the MELPOL® compound in water. The following properties were determined.

| Property | Amount of MELPOL® Compound in Foam | | | | | | |
|---|---|---|---|---|---|---|---|
| | 0 (control) | 0.1 | 0.3 | 0.5 | 0.75 | 1.0 | 1.5 |
| Results for Example 13 | | | | | | | |
| 25% ILD | 38.5 | 38.5 | 40.0 | 39.1 | 42.4 | 33.4 | 35.1 |
| Density | 1.79 | 1.73 | 1.81 | 1.74 | 1.75 | 1.74 | 1.68 |
| Porosity | 4.75 | 6.2 | 3.5 | 5.6 | 1.8 | 2.4 | 1.0 |
| Rise Time | 102 | 97 | 96 | 92 | 90 | 89 | 88 |
| Results for Example 14 | | | | | | | |
| 25% ILD | 32 | 32.4 | 33 | 37.3 | 30 | 28.2 | 28.1 |
| Density | 1.67 | 1.65 | 1.61 | 1.72 | 1.94 | 1.82 | 1.48 |
| Porosity | 3.8 | 4.0 | 3.6 | 3.0 | 4.1 | 5.0 | 4.2 |
| Rise Time | 104 | 121 | 118 | 90 | 99 | 111 | 95 |

For this particular foam-forming formulation, no further significant advantages in physical properties are found when the MELPOL® compound is utilized in an amount greater than 0.5 parts. However, in other foam formulations slightly larger amounts of the MELPOL® compound may be desirable.

EXAMPLES 15 AND 16:

The following foam formulations were prepared.

| Component | Parts by Weight for Example | |
|---|---|---|
| | 15 | 16 |
| polyether polyol* (3800 mw) | 100.0 | 100.0 |
| toluene diisocyanate (80/20) | 44 | 44.8 |
| isocyanate index | 110 | 112 |
| water | 3.5 | 3.5 |
| stannous octoate catalyst | 0.35 | 0.35 |
| silicone surfactant | 1.1 | 1.1 |
| amine catalyst | 0.27 | 0.27 |
| fire retardant additive | 8.0 | 8.0 |
| MELPOL ® blend** | 1.25 | 1.25 |

*Polyol 3800 from Dow Chemical
**Solution of 50% Melpol and 50% dipropylene glycol.

The following properties were determined:

| Property | Example | |
|---|---|---|
| | 15 | 16 |
| Density | 1.77 | 1.77 |
| Porosity | 4.44 | 4.38 |
| ILD (25%) | 30.25 | 32.6 |
| 90% Compression Set | 4.87 | 5.67 |
| MVSS 302 Burn Test | SE/NBR | SE/NBR |

These examples demonstrate that the improved results of the invention can be obtained by adding the MELPOL ® compound in a solution of dipropylene glycol.

While it is apparent that the invention herein disclosed is well calculated to fulfill the desired results, it will be appreciated that numerous modifications and embodiments may be devised by those skilled in the art, and it is intended that the appended claims cover all such modifications and embodiments as fall within the true spirit and scope of the present invention.

What is claimed is:

1. A flexible polyether derived polyurethane foam forming composition comprising a polyether polyol, an organic isocyanate compound, water, and a curing agent of the formula $$C_3N_6(R_2)_x(R_1)_{6-x}$$

wherein $R_1$ is hydrogen or an alkyl, alkenyl, cycloaliphatic or aryl moiety having between one and twelve carbon atoms; $R_2$ is an alkyl, alkenyl, cycloaliphatic or aryl moiety having between one and twelve carbon atoms and at least one hydroxyl moiety; and x is between about 0.5 and 6, which curing agent is substantially non-reactive with the foam forming components but which acts as a catalyst to the reaction of remaining isocyanate groups with moisture in the foam after formation thereof, said curing agent added in an amount effective to cause the reaction of a sufficient number of said remaining isocyanate groups with said moisture to improve the compression set properties of the resulting flexible foam but less than about 2 parts by weight based on 100 parts by weight polyol.

2. The composition of claim 1 wherein the curing agent is used in an amount of between 0.01 and 1.4 parts by weight based on 100 parts by weight of the polyether polyol, and wherein the water is present in an amount of less than 6 parts by weight based on 100 parts by weight of the polyether polyol.

3. The composition of claim 1 wherein the amount of curing agent is between 0.4 and 1.4 parts by weight based on 100 parts by weight of the polyether polyol.

4. The composition of claim 1 wherein $R_1$ is hydrogen, $R_2$ is a hydroxy alkyl moiety having between 2 and 4 carbon atoms, and x is between 2 and 3, inclusive.

5. A flexible polyether derived polyurethane foam forming composition comprising a polyether polyol, an organic isocyanate compound, water, a liquid phosphorous ester in an amount sufficient to impart flame retardance to the resulting foam and a curing agent of the formula $$C_3N_6(R_2)_x(R_1)_{6-x}$$

wherein $R_1$ is hydrogen or an alkyl, alkenyl, cycloaliphatic or aryl moeity having between one and twelve carbon atoms; $R_2$ is an alkyl, alkenyl, cycloaliphatic or aryl moeity having between one and twelve carbon atoms and at least one hydroxyl moeity; and x is between about 0.5 and 6, which curing agent is substantially non-reactive with the foam forming components but which acts as a catalyst to the reaction of remaining isocyanate groups with moisture in the foam after formation thereof, said curing agent added in an amount effective to cause the reaction of a sufficient number of said remaining isocyanate groups with said moisture to improve the compression set properties of the resulting flexible foam, but less than about 4 parts by weight based on 100 parts by weight polyol.

6. The composition of claim 5 wherein the amount of flame retardant agent ranges from about 4 to 8 parts.

7. The composition of claim 1 wherein the polyether polyol is a conventional, unmodified polyether polyol of a sufficient molecular weight and temperature so that the curing agent is at least partially soluble therein.

8. A flexible polyurethane foam formed from the foam-forming composition of any one of claims 1–7.

9. A method for rapidly curing and improving the compression set properties of a flexible polyether derived foam which comprises:
adding to a polyurethane foam-forming composition containing a polyether polyol, an organic isocyanate compound, and water in an amount effective to act as a blowing agent, a curing agent of the formula $$C_3N_6(R_2)_x(R_1)_{6-x''}$$

wherein $R_1$ is hydrogen or an alkyl, alkenyl, cycloaliphatic or aryl moiety having between one and twelve carbon atoms; $R_2$ is an alkyl, alkenyl, cycloaliphatic or aryl moiety having between one and twelve carbon atoms and at least one hydroxyl moiety; and x is between about 0.5 and 6, which curing agent is substantially non-reactive with the foam-forming components but which acts as a catalyst to the reaction of remaining isocyanate groups with moisture in the foam after formation thereof, said curing agent added in an amount effective to cause the rapid reaction of a sufficient number of said remaining isocyanate groups with said moisture to improve the compression set properties but less than about 2 parts by weight based on 100 parts by weight polyol; and
forming the polyurethane foam from said foam-forming composition, whereby said curing agent cures substantially all the resultant foam.

10. The method of claim 9 wherein the curing agent is present in an amount ranging from between about 0.01 and 1.4 parts by weight based on 100 parts by weight of the polyether polyol, and wherein the blowing agent is water in an amount of less than 6 parts by weight based on 100 parts by weight of the polyether polyol.

11. The method of claim 9 wherein the amount of curing agent ranges from between about 0.4 and 1.4 parts by weight based on 100 parts by weight of the polyether polyol.

12. The method of claim 9 wherein the polyether polyol is a conventional, unmodified polyether polyol of a sufficient molecular weight and temperature so that the curing agent can be at least partially solubilized therein.

13. The method of claim 12 wherein the curing agent and polyol are blended to form a mixture prior to being added to the remaining foam-forming components, wherein the amount of curing agent ranges between 25 and 50% by weight of said mixture.

14. The method of claim 9 wherein $R_1$ is hydrogen, $R_2$ is a hydroxy alkyl moiety having between 2 and 4 carbon atoms, and x is between 2 and 3, inclusive.

15. A method for maintaining the flame retardant properties of a flame retardant polyether polyurethane foam prepared from a polyurethane foam-forming composition comprising a polyether polyol, an organic isocyanate compound, water in an amount effective to act as a blowing agent, and a flame retardant additive which would normally be used in an amount of between 4 and 10 parts by weight based on 100 parts by weight of the polyether polyol, which method comprises:
the replacing a minor portion of the amount of the flame retardant additive with an amount of a replacement compound of the formula $C_3N_6(R_2)_x(R_1)_{6-x}$ wherein $R_1$ is hydrogen or an alkyl, alkenyl, cycloaliphatic or aryl moiety having between one and twelve carbon atoms; $R_2$ is an alkyl, alkenyl, cycloaliphatic or aryl moiety having between one and twelve carbon atoms and at least one hydroxyl moiety; and x is between about 0.5 and 6, which amount of said compound is between about 20 and 200 percent of the minor portion of the additive to be replaced, said replacement amount being 4 parts by weight or less based on 100 parts by weight of the polyether polyol; and
thereafter forming the foam from the foam-forming composition to obtain a flexible foam having substantially the same flame retardance as one wherein a portion of the flame retardant additive is not replaced with the replacement compound.

16. The method of claim 15 wherein the minor portion of the flame retardant additive is an amount of less than about 33 weight percent of the total amount of the additive.

17. The method of claim 15 wherein the amount of replacement compound ranges from 50 to 100 percent of the minor portion of the flame retardant additive to be replaced, and wherein the minor portion of the flame retardant additive is an amount of less than about 25 weight percent of the total amount of the additive.

18. The method of claim 15 wherein the polyether polyol is a conventional, unmodified polyether polyol; the blowing agent is water in an amount of less than 6 parts by weight; the minor portion of the flame retardant additive ranges from between about 1 and 6 parts by weight; and the replacement amount of replacement compound is between about 0.2 and 2 parts by weight, said amounts all based on 100 parts by weight of the conventional, unmodified polyether polyol.

19. The method of claim 15 wherein the predetermined amount of the flame retardant ranges from between about 1 and 2 parts by weight and wherein the amount of the replacement compound is between about 0.4 and 1.4 parts by weight, said amounts based on 100 parts by weight polyol.

20. The method of claim 15 wherein the flame retardant additive is reactive with the isocyanate compound.

21. The flexible flame retardant polyether derived polyurethane foam formed by the method of any one of claims 9 to 20.

22. The composition of claim 1 wherein $R_1$ is hydrogen, $R_2$ has at least 2 carbon atoms and x is at least 2.

23. The method of claim 9 wherein $R_1$ is hydrogen, $R_2$ has at least 2 carbon atoms and x is at least 2.

24. The method of claim 15 wherein $R_1$ is hydrogen, $R_2$ has at least 2 carbon atoms and x is at least 2.

25. The method of claim 15 wherein the fire retardant additive is a liquid phosphorus ester compound.

26. The composition of claim 22 wherein the curing agent is present in an amount of about 1.4 parts or less.

27. The method of claim 23 wherein the curing agent is present in an amount of about 1.4 parts or less.

28. The method of claim 24 wherein the curing agent is present in an amount of about 1.4 parts or less.

29. The method of claim 15 wherein $R_1$ is hydrogen, $R_2$ is a hydroxyl alkyl moiety having between 2 and 4 carbon atoms, and x is between 2 and 3, inclusive.

30. A flexible polyether derived polyurethane foam forming composition comprising a polyether polyol, an organic isocyanate compound, water, a liquid phosphorus ester in an amount sufficient to impart flame retardance to the resulting foam and a curing agent of the formula $C_3N_6(R_2)_x(R_1)_{6-x}$ wherein $R_1$ is hydrogen; $R_2$ is an isopropyl moeity; and x is between 1 and 3, which curing agent is substantially non-reactive with the foam forming components but which acts as a catalyst to the reaction of remaining isocyanate groups with moisture in the foam after formation thereof, said curing agent added in an amount effective to cause the reaction of a sufficient number of said remaining isocyanate groups with said moisture to improve the compression set properties of the resulting flexible foam, but less than about 2 parts by weight based on 100 parts by weight polyol.

31. A flexible polyether derived polyurethane foam forming composition comprising a polyether polyol, an organic isocyanate compound, water, a liquid phosphorus ester in an amount sufficient to impart flame retardance to the resulting foam and a curing agent of the formula $C_3N_6(R_2)_x(R_1)_{6-x}$ wherein $R_1$ is hydrogen; $R_2$ is an isopropyl moeity; and x is between 1 and 3, which curing agent is substantially non-reactive with the foam forming components but which acts as a catalyst to the reaction of remaining isocyanate groups with moisture in the foam after formation thereof, said curing agent added in an amount effective to cause the reaction of a sufficient number of said remaining isocyanate groups with said moisture to improve the compression set properties of the resulting flexible foam, but less than about 4 parts by weight based on 100 parts by weight polyol.

* * * * *